US009909690B2

(12) United States Patent
Tinoco et al.

(10) Patent No.: US 9,909,690 B2
(45) Date of Patent: Mar. 6, 2018

(54) TRANSPORTATION AND INSTALLATION OF ELONGATE SUBSEA ELEMENTS (71) Applicant: Subsea 7 Limited, Sutton (GB)

(72) Inventors: Francisco Javier Tinoco, London (GB); Kee Chien Ting, Epsom (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 15/122,920

(22) PCT Filed: Mar. 9, 2015

(86) PCT No.: PCT/GB2015/050679
§ 371 (c)(1),
(2) Date: Aug. 31, 2016

(87) PCT Pub. No.: WO2015/132613
PCT Pub. Date: Sep. 11, 2015

(65) Prior Publication Data
US 2017/0074424 A1 Mar. 16, 2017

(30) Foreign Application Priority Data

Mar. 7, 2014 (GB) .................................. 1404092.7

(51) Int. Cl.
*F16L 1/20* (2006.01)
*F16L 1/235* (2006.01)
(Continued)

(52) U.S. Cl.
CPC ................ *F16L 1/20* (2013.01); *B63B 35/03* (2013.01); *F16L 1/235* (2013.01); *F16L 1/26* (2013.01); *F16L 9/22* (2013.01); *F17D 5/00* (2013.01)

(58) Field of Classification Search
CPC .................. F16L 1/12; F16L 1/14; F16L 1/15
See application file for complete search history.

(56) References Cited

U.S. PATENT DOCUMENTS 3,893,305 A * 7/1975 Walker ..................... B21D 7/10
405/168.1
3,955,599 A 5/1976 Walker
(Continued)

FOREIGN PATENT DOCUMENTS

AU 2012203233 6/2012
GB 2492414 1/2013
(Continued)

*Primary Examiner* — John J Kreck
(74) *Attorney, Agent, or Firm* — Levy & Grandinetti (57) ABSTRACT A method of handling a discrete elongate subsea element of determinate length, such as a spool of rigid pipe is disclosed. The method includes shortening a tensile chord system acting on longitudinally-spaced locations on the element to apply longitudinally-compressive forces to the element. The compressive forces bend the element along its length against elastic recovery force to shorten the span of the element. One end of the element is anchored at a first anchorage before or after the element is bent. The other end of the element is anchored at a second anchorage, after the element is bent and while the element remains bent. The method is apt to be used during installation of the element, where the anchorages are both underwater, and during transportation of the element, where the anchorages are hang-off platforms of a surface vessel.

31 Claims, 7 Drawing Sheets (51) Int. Cl.
*F16L 1/26* (2006.01)
*B63B 35/03* (2006.01)
*F16L 9/22* (2006.01)
*F17D 5/00* (2006.01)

(56) References Cited

U.S. PATENT DOCUMENTS

| | | | |
|---|---|---|---|
| 4,225,270 A * | 9/1980 | Dareing | E21B 43/0135 |
| | | | 166/346 |
| 5,192,166 A | 3/1993 | Persson | |
| 5,593,249 A | 1/1997 | Cox et al. | |
| 6,030,145 A | 2/2000 | Stewart, Jr. et al. | |
| 6,467,424 B1 * | 10/2002 | Yates | B63C 11/00 |
| | | | 114/312 |
| 8,123,437 B2 | 2/2012 | Wolbers et al. | |
| 8,562,255 B2 | 10/2013 | Persson | |
| 2006/0067792 A1 | 3/2006 | Joshi et al. | |
| 2008/0014026 A1 | 1/2008 | Routeau et al. | |
| 2009/0214298 A1 | 8/2009 | Brown et al. | |
| 2010/0294871 A1 * | 11/2010 | Buijvoets | F16L 1/203 |
| | | | 242/360 |
| 2013/0004240 A1 * | 1/2013 | Pionetti | F16L 1/19 |
| | | | 405/168.4 |

FOREIGN PATENT DOCUMENTS

| | | |
|---|---|---|
| WO | WO 03012327 | 2/2003 |
| WO | WO 2009040098 | 4/2009 |
| WO | WO 2010012895 | 2/2010 |
| WO | WO 2012045433 | 4/2012 |

\* cited by examiner

TRANSPORTATION AND INSTALLATION OF ELONGATE SUBSEA ELEMENTS

This invention relates to the transportation and installation of elongate subsea elements, especially rigid pipes for use as tie-in connections. More generally, the inventive concept includes methods and apparatus for handling discrete double-ended subsea elements of determinate length such as pipeline sections or other elements that are elastically pliant. Methods and apparatus of the invention are also apt for connecting the two opposed ends of such elements to respective predetermined locations in a subsea installation or on a transport vessel.

A typical deepwater oil and gas production installation comprises numerous elements on the seabed, including satellite wells that collectively feed a common export pipeline via manifolds or other connecting elements. Other elements of a subsea installation may include PLETs, PLEMs and trees. Many of those elements have to be connected to other elements of the installation by tie-in connections. Tie-in connections comprise pipes that carry fluids such as well fluids, injection water, injection chemicals and riser lift gas between different flowlines.

Tie-in connections are known in the subsea oil and gas industry as 'spools' and 'jumpers'. The latter are a subset of the former and are characterised by intermediate sections that stand up from the seabed to connect to pre-existing vertical connectors or to reduce friction between the pipe and the seabed under movement caused by thermal expansion and contraction. Rigid spools will be used to exemplify the invention in the description that follows, it being understood that the invention relates more generally to elongate subsea elements that can be deflected elastically to be bent along their length and whose opposed ends are to be connected to respective predetermined locations on the seabed.

A spool can comprise a flexible pipe characterised by a small MBR (minimum bending radius), which is typically about 5 m. In that case, the spool may be installed by laying the flexible pipe from a reel-lay surface vessel. However, a flexible pipe solution is costly and so is reserved for spools that are so lengthy as to make the use of rigid pipe impractical. In other words, there is a preference to use rigid pipe where possible, wherever the length of a spool and other parameters of the subsea installation allow.

In the context of the invention, 'rigid' means a pipe that is largely or exclusively made of a stiff, rigid material, such as a rigid steel pipe or a pipe of bonded composite material. The typical structure of such a composite pipe comprises an internal thermoplastics layer, on which is bonded a layer of composite plastics material comprising a typically thermoplastic resin matrix and embedded reinforcing fibres. Examples of resins used in such pipes include polyethylene, polypropylene and PEEK. Examples of reinforcing fibres used in such pipes include glass fibres, carbon fibres and aramid fibres.

Those skilled in the art understand clearly the distinction between the terms 'rigid' and 'flexible', as used in relation to pipes in the subsea oil and gas industry. They also know that a rigid pipe is not devoid of flexibility. Whilst plastic deformation of rigid spools must generally be avoided both during installation and in use, elastic deformation of such spools while observing the MBR is expected and indeed designed for. For example, spools have to accommodate movement due to environmental loading, low-strength soils, pipe-walking and thermal expansion resulting from high product temperatures. Spools also have to accommodate the tolerances of fabrication and installation.

To save cost, there is a desire to adopt longer rigid spools to do the job previously performed by more expensive flexible pipe solutions. The genesis of the invention arises from the challenges of transporting and installing long spools of bonded composites or of steel of small wall thickness, which are characterised by an MBR that is substantially greater than that of flexible pipe. As a non-limiting example, the MBR of a rigid steel or bonded composite pipe suitable for the purposes of the invention may be about 15 m rather than the 5 m that is typical of flexible pipe. If bent significantly beyond its MBR, a steel pipe will buckle whereas a composite pipe will fracture.

One of the problems addressed by the invention is that some pipeline sections are too short or too stiff for spooling on a reel to be practical and yet are too long to be transported conveniently in a straight configuration.

As rigid spools typically have a length that greatly exceeds their diameter, they are susceptible to bending under self-weight and to buckling or fracturing at locations of high stress before being properly supported on the seabed for use. Consequently, rigid spools are commonly handled using a supporting structure, specifically by being suspended from a spreader bar or frame or being carried by a support frame.

The feasibility of using supporting structures for rigid spools is determined by the length of such spools. A supporting structure for a long rigid spool is a particularly bulky, heavy and costly assembly that may be too large to be handled by, or transported on the deck of, conventional installation vessels such as barges. Also, the weight of the assembly of the spool and its supporting structure may exceed the crane capacity of available vessels. These are reasons why flexible pipe tends to be preferred for long spools, despite its high price.

As the feasibility of using a supporting structure, in turn, limits the length of rigid spools, proposals have been made to avoid the use of a supporting structure entirely. For example, a rigid spool may be suspended from an installation vessel and lowered into the water column in an upright, substantially vertical orientation. To achieve this, the rigid spool may be fabricated on the installation vessel at an installation site and advanced vertically toward the seabed. Alternatively, the rigid spool may be towed to the installation site by the installation vessel, either in a vertical orientation where the water is deep enough or in a horizontal orientation before, optionally, being tilted into a vertical orientation. However, a towing operation is susceptible to weather disruption and a tilting operation risks over-stressing the spool.

To avoid a requirement for back-tension, the lower end of a rigid spool may be connected at an appropriate angle to a first fixed point on the seabed. Then the upper end of the spool may be lowered and connected to a second fixed point on the seabed. Alternatively, the whole spool may be laid directly on the seabed before one end is connected to a first fixed point on the seabed and the other end is connected to a second fixed point on the seabed. In either case, the radius of curvature of the spool changes during the installation process, which stresses the spool and so requires careful control. However, prior art solutions are not ideally effective for controlling pipe curvature.

As will be seen, the invention exploits the elastic flexibility of rigid pipes and provides effective control of pipe curvature. Prior art exists that is superficially similar in its approach but is, in reality, irrelevant for the purposes of the invention.

For example, US 2013/004240 describes an initiation method for installing an undersea line, which may be a flexible or rigid pipe, an electric cable or an umbilical. An installation vessel fabricates a rigid pipe or unspools a flexible pipe, cable or umbilical to be suspended vertically beneath the vessel. The lower end of the line is lowered toward the seabed as further rigid pipe sections are added or as further flexible pipe, cable or umbilical is unspooled. Before the lower end of the line reaches the seabed, a variable-length wire system connected to longitudinally-spaced locations near the lower end of the line acts in tension to impart longitudinal curvature in the bottom section of the otherwise vertical line. The wire defines a chord, in the broad sense of a line segment that joins two points on a curve.

While keeping the bending radius greater than the MBR of the line in question, the chord is shortened by shortening the wire to increase the curvature of the line until the lower end of the line is oriented nearer to the horizontal. Then the lower end of the line is connected to an anchor defining a fixed point on the seabed. The bend can then be laid on the seabed to initiate laying, whereupon the bend straightens under tension as the installation vessel pulls the catenary. Thus, the chord length is increased by lengthening the wire.

It will be apparent that bending of the line in US 2013/004240 takes place above the seabed and exclusively in a vertical plane. The method is useful only for connecting one end of a line to one fixed point on the seabed and then only for initiating a line of indeterminate length. As bending is released to continue laying, US 2013/004240 does not teach how to connect a second end of a pipe to a second fixed point on the seabed. At the time of installation and while bending takes place, the line of US 2013/004240 is not a discrete elongate subsea element of determinate length. Also, to the extent that the line of US 2013/004240 has two ends, only one of those ends is underwater during bending.

The teaching of US 2013/004240 is not useful for installing spools, which are generally shorter than flowlines and can easily be displaced on the seabed by a crane, or more generally for installing pipe sections that are shorter than the water depth or where both ends are underwater. Nor does US 2013/004240 propose any solution to the problem of transporting a long rigid spool to the laying site: it either transports a flexible pipe, cable or umbilical to the laying site or it fabricates a rigid pipe at the laying site.

U.S. Pat. No. 3,955,599 discloses apparatus for terminating a subsea flowline at an offshore structure by providing an upstanding bend in the steel flowline, hence also acting in a vertical plane. For this purpose, a pipe bending device comprises a segmented sleeve assembled over the flowline. Adjacent segments of the sleeve are pivotally connected to each other, whereas end segments of the sleeve are connected to each other by a cylinder and piston. Retraction of the piston into the cylinder bends the segmented sleeve and hence bends the flowline uniformly within the sleeve. The flowline is bent beyond its MBR and hence beyond its yield strength to effect permanent plastic deformation, but without buckling in view of the support of the sleeve.

The segmented sleeve of U.S. Pat. No. 3,955,599 is very complex and is of no use for bending a long pipe section accurately within its elastic limit or indeed for making a bend of longer than a few metres. Nor is the teaching of U.S. Pat. No. 3,955,599 of any use for connecting respective ends of a spool to first and second fixed points on the seabed. Again, U.S. Pat. No. 3,955,599 does not propose any solution to the problem of transporting a long rigid spool to the laying site.

U.S. Pat. Nos. 8,123,437, 8,562,255 and WO 03/012327 describe various bend-restricting arrangements for restricting the upward bend of a pipe from the seabed towards a surface vessel. In all three cases, the restrictors are for use on the sea bed, and for bending in a vertical plane. Such devices are of no use in connecting a pipe between a pair of fixed points on the seabed.

US 2009/0214298 relates to a subsea installation in which a pipeline is secured at either end by respective anchoring points, and a buoyancy means is provided between the anchoring points to bend the pipeline in the vertical plane to lift it clear of seabed contours. US 2006/0067792 similarly uses buoyancy to bend a pipeline in the vertical plane to clear a seabed feature. In each case the purpose of bending the pipeline is therefore not to aid installation, and indeed the buoyancy means hinder installation to some extent as the pipeline is bent in situ against the buoyant force for connection to the anchoring points.

U.S. Pat. No. 5,192,166 describes a method for deforming an installed pipeline in situ to match seabed contours by using weight loading at key locations in the pipe to achieve controlled cold bending. As the method relates to bending of a pipeline post installation, it is of no use in enabling connection of a pipeline of determinate length between a pair of fixed points on the seabed.

It is against this background that the present invention has been devised.

Broadly, the inventive concept involves permanent or temporary control of a bending moment of an elongate subsea element by controlling its radius of curvature. The control of curvature is achieved by controlling the length of one or more tensile chord elements that impart longitudinally-compressive forces to longitudinally-spaced locations on the element.

From one aspect, the invention finds expression in a method of handling a discrete elongate subsea element of determinate length for transport or installation. The method of the invention comprises: shortening a tensile chord system acting on longitudinally-spaced locations on the element to apply longitudinally-compressive forces to the element, which forces bend the element along its length between said locations against elastic recovery force to shorten a span of the element; anchoring a first end of the element at a first anchorage before or after said bending of the element; and after said bending of the element and while the element remains bent, anchoring a second end of the element at a second anchorage.

Preferably, the first end of the element is anchored at the first anchorage, then the element is bent, and then the second end of the bent element is anchored at the second anchorage.

The tensile chord system may be left in place and under tension after anchoring the second end of the bent element at the second anchorage. Alternatively, the tensile chord system may instead be de-tensioned and replaced with a tensile support member after anchoring the second end of the bent element at the second anchorage.

At least one of the longitudinally-spaced locations may be substantially inboard of an end of the element. However, that location is preferably nearer an adjacent end of the element than a longitudinal mid-point of the element. However, it is also possible for at least one of the longitudinally-spaced locations to be at an end connector of the element.

The tensile chord system is suitably connected to the element at the longitudinally-spaced locations. However, it is possible instead for the tensile chord system to be connected to the element at one of the longitudinally-spaced locations and also to be connected to the first anchorage before the element is bent. In that case, the other of the longitudinally-spaced locations on the element is at the first end where the element is anchored to the first anchorage.

The tensile chord system may be connected to the element or to the first anchorage underwater or above water.

In one major option, the first and second anchorages may be located above water, for example as hang-off platforms on a surface vessel for transporting the elongate element. In that case, the anchored first end of the element may be hung from the first anchorage and the element may then be bent before the second end of the bent element is anchored to and hung from the second anchorage. To achieve this, the element is suitably pulled toward the surface vessel during or after bending to lift the second end toward the second anchorage.

The bent element may be transported to an installation site carried by the surface vessel, with the element anchored at its first and second ends to the anchorages. Then, at the installation site, the element may be removed from the anchorages before being lowered toward the seabed. For example, the element may be removed from one of the anchorages and may then be pivoted about the other anchorage before being released from that other anchorage and lowered toward the seabed. The tensile chord system may be adjusted to modify a bend radius of the element before, during or after lowering the element toward the seabed.

In another major option, the first and second anchorages may be located underwater at a subsea installation. In that case, at least part of the element may be landed on the seabed before anchoring the second end of the element at the second anchorage. Indeed, it is possible to land at least part of the element on the seabed before anchoring the first end of the element at the first anchorage.

The tensile chord system may be adjusted to modify a bend radius of the element after anchoring the first end of the element at the first anchorage and before anchoring the second end of the element at the second anchorage. The element is preferably bent in a substantially horizontal plane when installed underwater.

The first end of the element is preferably anchored at the first anchorage and then the element may be swung about the first anchorage before anchoring the second end of the element at the second anchorage. The element is suitably swung about an upright axis.

The second end of the element is suitably suspended by a wire hanging from a surface vessel before the second end of the element is anchored at the second anchorage. It is also possible to suspend the second end of the element from such a wire before anchoring the first end of the element at the first anchorage. For example, the element may hang in a substantially vertical orientation while being lowered, with its first end downward to be landed on the first anchorage. This may facilitate a stab-and-hinge-over installation solution.

The method of the invention may comprise flying an underwater vehicle such as an ROV to the element, suitably to a location between the longitudinally-spaced locations of the element. Such a vehicle, or a skid or tool mounted to such a vehicle, may carry tensile components of the tensile chord system. In that case, at least one of the tensile components may be attached to the element and another tensile component may be attached elsewhere to the element or to the first anchorage. Then, the tensile components may be retracted toward the vehicle, skid or tool to shorten the tensile chord system and to impart a desired bend to the element.

Within the inventive concept, the invention may also be expressed as a subsea installation comprising: a discrete elongate subsea element that is bent along its length against elastic recovery force; a first subsea anchorage at which a first end of the bent element is anchored; and a second subsea anchorage at which a second end of the bent element is anchored; wherein the anchorages and a tensile restraint hold the subsea element bent against the elastic recovery force.

Similarly, a related expression of the inventive concept is a surface vessel carrying a discrete elongate subsea element that is bent along its length against elastic recovery force, the vessel having a first anchorage at which a first end of the bent element is anchored, and a second anchorage at which a second end of the bent element is anchored, wherein the anchorages and a tensile restraint hold the subsea element bent against the elastic recovery force.

In either a subsea installation or a vessel, the tensile restraint may comprise a tensile chord system that is connected to act on longitudinally-spaced locations on the element to apply longitudinally-compressive forces to the element that bend the element.

The inventive concept extends to a submersible puller for use in the method of the invention as part of a tensile chord system. The puller is embodied as an underwater vehicle or as a skid or tool that can be mounted to an underwater vehicle. The puller comprises: a structure; first and second tensile elements arranged to extend in opposed directions from the structure; and a tensioning drive that is operable to retract the tensile elements toward the structure. The tensioning drive may comprise at least one winch acting on wires that serve as the tensile elements and preferably comprises first and second winches, each winch acting on a respective one of the wires. Alternatively, the tensioning drive may comprise at least one jack acting on the tensile elements, which could instead be rigid elements such as rods.

Finally, the inventive concept embraces an elastically-bendable elongate subsea element fitted with a tensile chord system connected to longitudinally-spaced locations disposed at or near to respective ends of the element for bending the element along its length between said locations against elastic recovery force. As in other expressions of the inventive concept, the tensile chord system comprises first and second tensile elements extending in opposed directions from a structure; and a tensioning drive that is operable to retract the tensile elements toward the structure.

In specific embodiments, the invention may be expressed in terms of methods to control the radius of curvature of a stiff but elastically-pliant pipeline section during transport and subsea installation. For example, during installation of such a pipeline section, the method may comprise:

a) connecting the ends of a variable-length wire system at or near respective ends of a pipeline section;
b) lowering the pipeline section under water, before or preferably after a);
c) laying a first end of the pipeline section on the seabed or connecting it to a first fixed point near the seabed;
d) laying a second end of the pipeline section on the seabed or supporting it above the seabed, preferably after c);
e) changing a chord length of the variable-length wire system to bend the pipeline section to any curvature radius greater than its MBR; and
f) controllably modifying the chord length by the variable-length wire system to connect the second end of the pipeline section to a second fixed point near the seabed, with assistance of a handling device such as a crane, winch or ROV.

Optionally, step d) can be omitted and merged with step f), so that step f) then involves controllably modifying the chord length by the variable-length wire system before laying the second end of the pipeline section on the seabed or connecting that second end to a second fixed point near the seabed.

A further option, if needed, is to add a step g), namely to replace the variable-length wire system by a fixed wire to maintain permanent bending. A further alternative to that optional step g) is to leave the variable-length wire system in place and under tension for as long as curvature of the pipeline section is to be maintained.

During transport of a stiff but elastically-pliant pipeline section using a transport vessel, the method may comprise:
a) connecting the ends of a variable-length wire system at or near respective first and second ends of the pipeline section;
b) suspending the pipeline section from a first hang-off structure on the hull of the transport vessel, at or near to the first end;
c) changing a chord length of the variable-length wire system to bend the pipeline section underwater to any curvature radius greater than its MBR, in such a way that the chord length remains less than than the spacing between the first hang-off structure and a second hang-off structure also located on the hull of the transport vessel; and
d) connecting the pipeline section to the second hang-off structure at or near to the second end.

In a specific embodiment, a submersible apparatus for controllably varying the curvature of a stiff but elastically-pliant pipeline section may comprise:
a skid that can be coupled to an ROV or that is self-buoyant;
at least two winches mounted on the skid, operable simultaneously or independently;
at least two wires respectively spooled on the winches; and
as an optional addition, a pivoting interface for immovably but preferably releasably connecting each wire to a pipeline section, which interface may comprise shackles, clamps or hooks merely as examples.

In this respect, it is known for an ROV skid to be provided with a single winch for pulling a pipeline end towards another pipeline end for subsequent connection. One example is disclosed in U.S. Pat. No. 5,593,249. However such an arrangement would be too complicated for the purposes of the present invention as it would require the skid or the ROV to be clamped to the pipeline.

In order that the invention may be more readily understood, reference will now be made, by way of example, to the accompanying drawings in which.

Figure 1:
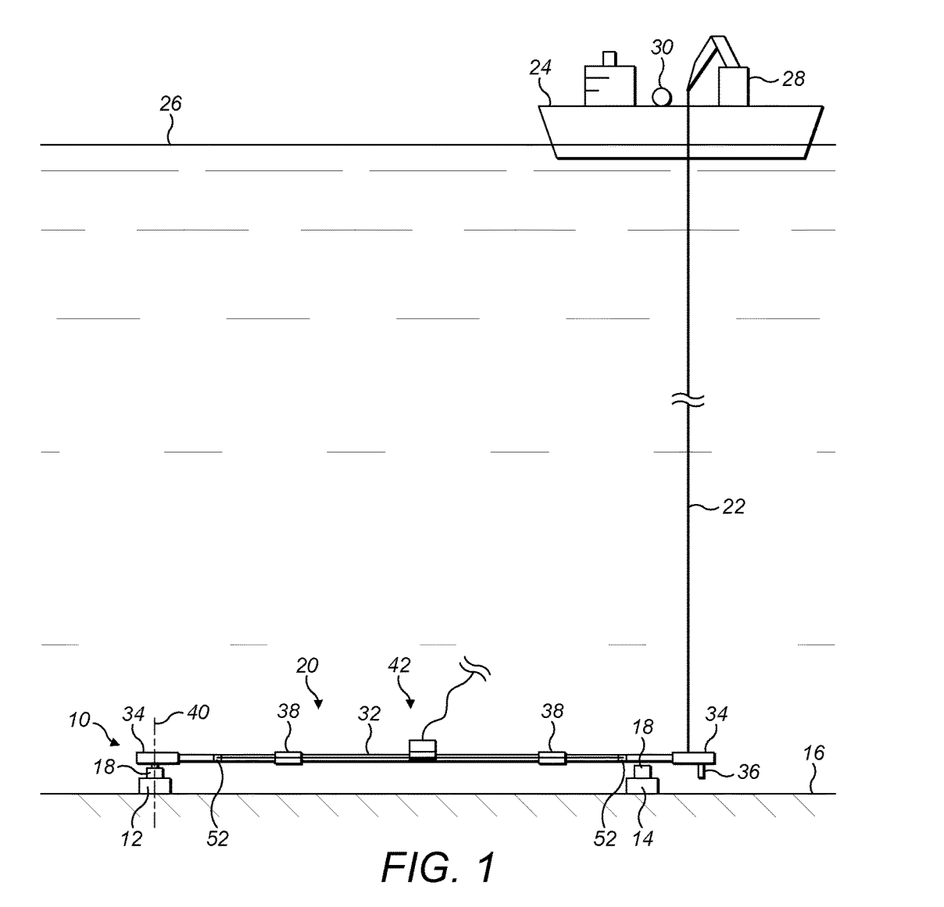
FIG. 1 is a schematic side view of a spool that has been anchored at its first end by landing previously in a first subsea structure and that is now supported at an opposed second end by a crane of an installation vessel in accordance with the invention.

Referring firstly to FIG. 1, this shows schematically a subsea installation 10 comprising first and second subsea structures 12, 14 respectively, positioned at spaced-apart locations on the seabed 16.

In this example, the subsea structures 12, 14 support respective upwardly-opening female connector receptacles 18. The connector receptacles 18 are arranged for coupling to respective ends of a horizontally-oriented spool 20, as will be described below.

A free end of the spool 20 is supported by a wire 22 hanging from an installation vessel 24 at the surface 26. Here, the wire 22 hangs from a crane 28 of the vessel 24 although an abandonment-and-recovery (A&R) winch 30 of the vessel 24 could be used instead.

In the simplified example shown in FIG. 1, the spool 20 comprises a pipe 32 of rigid but elastically-flexible composite material with end connectors 34 of steel at each end. When the end connectors 34 are coupled to the connector receptacles 18, the spool 20 will span the gap between the subsea structures 12, 14 and will provide for fluid communication between them.

The pipe 32 of the spool 20 is nominally straight when relaxed as shown in FIG. 1, although it may have slight curvature in practice due to self-weight or other loads. Other spool shapes are, of course, possible to suit the design of a particular subsea installation, for example to include upstanding jumper formations.

Each end connector 34 of the spool 20 comprises a male stab formation 36 that is arranged to be received in a respective one of the connector receptacles 18 of the subsea structures 12, 14. For this purpose, the stab formations 36 of the end connectors 34 extend downwardly to enable them to be landed in the connector receptacles 18 as the spool 20 is lowered by the crane 28 in a coupling movement.

In this example, the spool 20 further comprises buoyancy-correction accessories 38 sleeved around the pipe 32. The buoyancy-correction accessories 38 may comprise floats or ballast, depending on the weight of the pipe material in water and on the fluid content of the pipe 32 in service, in particular oil or gas. For example, a pipe of composite material is buoyant when empty and is flooded for installation. If floats are used, they are typically of incompressible syntactic foam.

The buoyancy-correction accessories 38 are designed to impart slightly negative buoyancy to the spool 20 and hence to optimise the apparent weight experienced by the wire 22 when the spool 20 is submerged; they also balance the spool 20 as the pipe is bent in a horizontal plane, as will be described.

In FIG. 1, the stab formation 36 at a first end of the spool 20 has already been landed in the connector receptacle 18 of the first subsea structure 12. In this way, the first subsea structure 12 provides an anchor or fulcrum defining a vertical pivot axis 40 about which the spool 20 can be pivoted to couple the opposed second end of the spool 20 with the second subsea structure 14.

The wire 22 is shown in FIG. 1 supporting the second end of the spool 20 in a generally horizontal orientation while the first subsea structure 12 supports the first end of the spool 20. Moving the crane 28 or the vessel 24 effects translation of the wire 22 across the seabed 16 to pivot the spool 20 about the vertical pivot axis 40 while the spool 20 remains in a generally horizontal plane. An ROV can also, or alternatively, pull the wire 22 or the spool 20 to swing the second end of the spool 20 across the seabed and particularly to effect fine positioning of that second end for coupling with the second subsea structure 14.

As the spool 20 pivots in this way, the stab formation 36 at the second end of the spool 20 describes an arc whose radius is centred on the vertical pivot axis 40. That vertical pivot axis 40 extends along the stab formation 36 at the first end of the spool 20, and is centred within the connector receptacle 18 of the first subsea structure 12.

When the spool 20 is straight as shown in FIG. 1, the distance between the stab formations 36 of the end connectors 34—corresponding to the radius of the arc described by the stab formation 36 at the second end of the spool 20—exceeds the distance between the connector receptacles 18 of the subsea structures 12, 14. Consequently, to be coupled also with the second subsea structure 14 when pivoted into suitable alignment, the spool 20 must be bent in a generally horizontal plane until the radius of arc shortens to the extent that the distance between the stab formations 36 matches the distance between the connector receptacles 18. In other words, the spool 20 is bent elastically to reduce its span.

Figure 2:
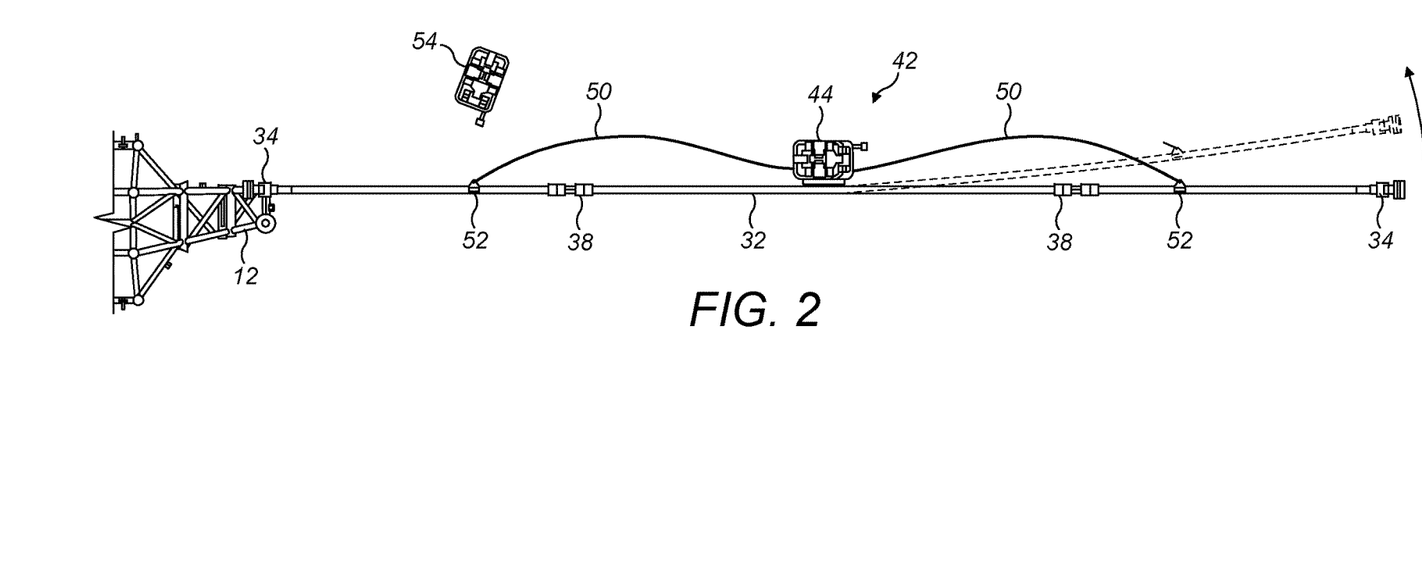
FIG. 2 is a plan view of the spool of FIG. 1 anchored at its first end to the first subsea structure, this view showing more clearly a skid-equipped ROV in accordance with the invention supporting a variable-length wire system connected to longitudinally-spaced locations on the spool.
Figure 3:
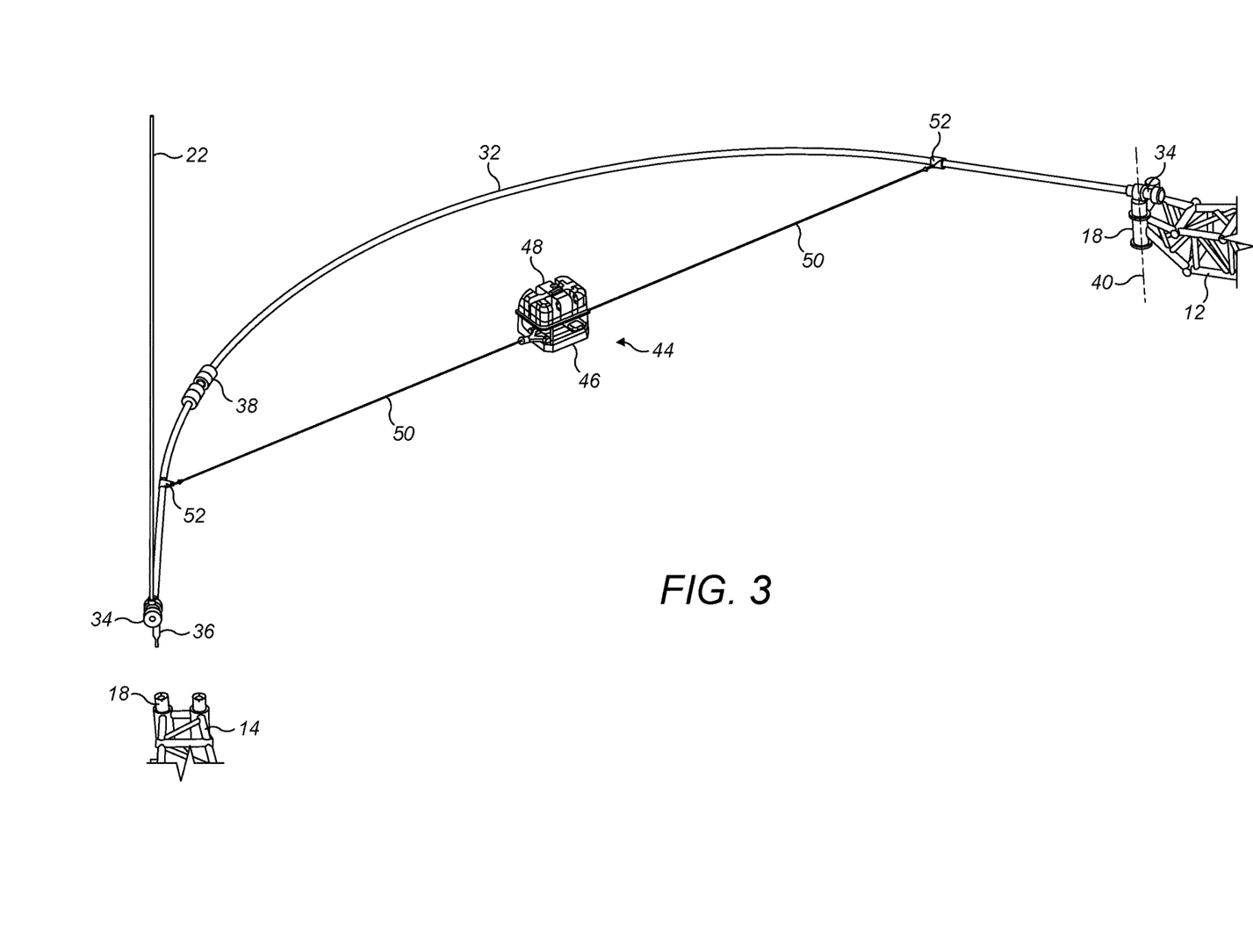
FIG. 3 is a perspective view of the spool of FIG. 2 now curved in a horizontal plane by virtue of compression applied to the spool by tension in the variable-length wire system, the second end being guided by the crane of the installation vessel to approach landing in a second subsea structure.
Figure 4:
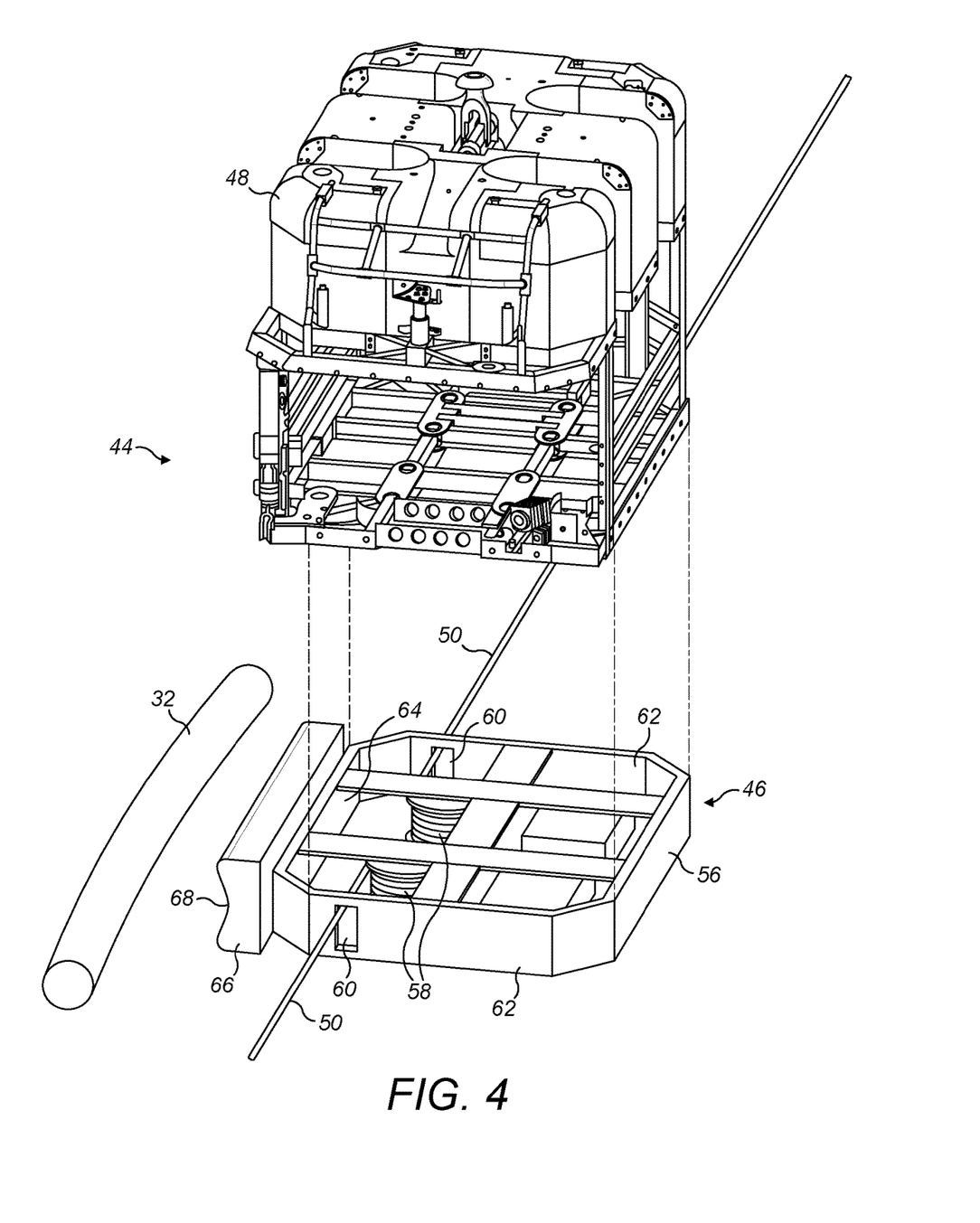
FIG. 4 is an exploded perspective view of an ROV and skid in accordance with the invention showing the variable-length wire system embodied in the skid.

Features shown schematically in FIG. 1 for the purpose of bending the spool 20 are shown in more detail in FIGS. 2 and 3, in which like numerals are used for like parts. Specifically, a puller system 42 in accordance with the invention comprises a submersible puller device 44 embodied here in a skid 46 mounted to an ROV 48. The puller device 44 carries puller wires 50 that extend from the puller device 44 in opposite directions. The puller wires 50 terminate at their outward ends at longitudinally-spaced clamp sleeves 52 on the pipe 32 of the spool 20, where well-known subsea ROV-operable latches may be operated to connect the puller wires 50 to the clamp sleeves 52. Then, a wire drive system in the skid 46, which will be described with reference to FIG. 4, is operable to retract and hence to tension the puller wires 50.

The interface between each clamp sleeve 52 and the pipe 32 of the spool 20 ensures that the clamp sleeves 52 grip the pipe 32 firmly and therefore do not slide toward each other along the pipe 32 under loads applied through the puller wires 50. Consequently, the tension applied to the puller wires 50 by the wire drive system in the skid 46 applies longitudinal compression to the pipe 32, which causes the pipe 32 to bend against its elastic restoring force as best shown in FIG. 3. Specifically, the inward side of the pipe 32 relative to the bend is put under compression and the outward side of the pipe 32 relative to the bend is put under tension, with the central longitudinal axis of the pipe 32 being a neutral axis that experiences no longitudinal stress or strain.

It will be apparent from FIG. 3 that the bent pipe 32 is akin to a bow stave and that, collectively, the puller wires 50 extending from the puller device 44 are akin to a bow string.

In preparation for bending the pipe 32 of the spool 20, the ROV 48 is flown to a position beside the pipe 32 approximately mid-way between the clamp sleeves 52. The puller wires 50 are deployed and extended from the skid 46 to be attached underwater to the clamp sleeves 52, for which purposes a supporting ROV 54 is shown in FIG. 2.

FIG. 2 shows the puller wires 50 connected to the clamp sleeves 52 but initially slack. At the moment the puller wires 50 first come under tension and hence straighten, the pipe 32 is straight and lies parallel to the puller wires 50. Dashed lines in FIG. 2 show the pipe 32 of the spool 20 starting to deflect in a horizontal plane after the puller wires 50 come under tension and then retraction of the puller wires 50 into the puller device 44 continues.

Bending of the pipe 32 of the spool 20 initiates and continues in a predictable plane determined by the slight lateral offset of the puller wires 50 and their attachment points on the clamp sleeves 52 from the central longitudinal axis of the pipe 32. Both of the puller wires 50 are substantially aligned and disposed to the same side of the pipe 32, which becomes the inward side of the developing bend. The puller wires 50 then lie in substantially the same plane as the bent pipe 32.

FIG. 3 shows the pipe 32 of the spool 20 bent elastically to reduce its span, such that the distance between the stab formations 36 of the end connectors 34 matches the distance between the connector receptacles 18 of the first and second subsea structures 12, 14. This enables the stab formation 36 at the second end of the spool 20 to be coupled also with the second subsea structure 14 when the spool 20 is pivoted about the vertical pivot axis 40 into suitable alignment.

As the second end of the spool 20 is supported by the wire 22 of the crane 28 hanging from the installation vessel 24, moving the crane 28 or the vessel 24 effects translation of the wire 22 across the seabed 16. This swings the spool 20 about the vertical pivot axis 40 until the stab formation 36 at the second end of the spool 20 aligns with the connector receptacle 18 of the second subsea structure 14. The stab formation 36 may then be lowered into the connector receptacle 18 to complete engagement and to establish fluid communication between the first and second subsea structures 12, 14 through the pipe 32 of the spool 20.

The greatly-enlarged view of FIG. 4 shows the skid 46 exploded away from the underside of the ROV 48 to show the interior of the skid 46. In this example, the skid 46 comprises a hollow frame 56 that is of generally rectangular shape in plan view to match the plan form of the ROV 48. The frame 56 supports and contains a wire drive system comprising a pair of winches 58, each of which spools a respective one of the puller wires 50. The puller wires 50 exit the frame 56 in opposition and alignment through respective openings 60 in opposed side walls 62 of the frame 56.

An end wall 64 of the frame 56 that is orthogonal to the opposed side walls 62 carries an elongate resilient bumper 66. The bumper 66 extends generally parallel to the tensioned puller wires 50 and the pipe 32 of the spool 20 in the same horizontal plane as the puller wires 50 and the pipe 32. The bumper 66 protects the skid 46 by bearing against the pipe 32, both when the ROV 48 is flown to a position between the clamp sleeves 52 and when the puller wires 50 first come under tension before the pipe 32 bends.

To locate the skid 46 relative to the pipe 32 at this initial stage and particularly to keep the skid 46 in the same horizontal plane as the puller wires 50 and the pipe 32, the outer face of the bumper 66 has a shallow groove-like longitudinal recess 68 extending along the full length of the bumper 66. The recess makes the bumper 66 outwardly concave in side view to seat against the convex curvature of the pipe 32. This allows secure location of the ROV 48 relative to the pipe 32 to ensure that the pipe 32 will start to bend predictably and as desired when the puller wires 50 are tensioned and retracted onto the winches 58 in the skid 46. Wth continued retraction of the tensioned puller wires 50, the puller wires 50 will start to pull the skid 46 away from the developing central apex of the pipe 32 as shown in FIG. 3.

Figure 5A:
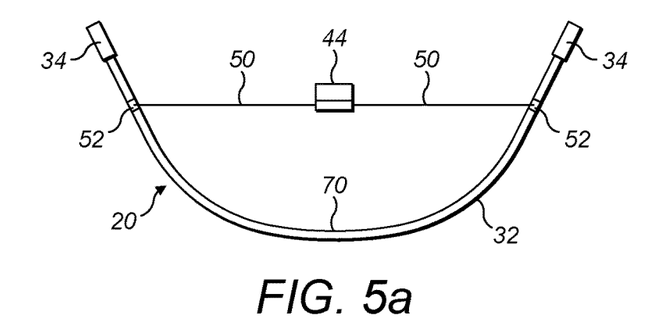
FIGS. 5*a*, 5*b* and 5*c* are schematic plan views showing optional attachment points on the spool for the variable-length wire system of the invention.
Figure 5B:
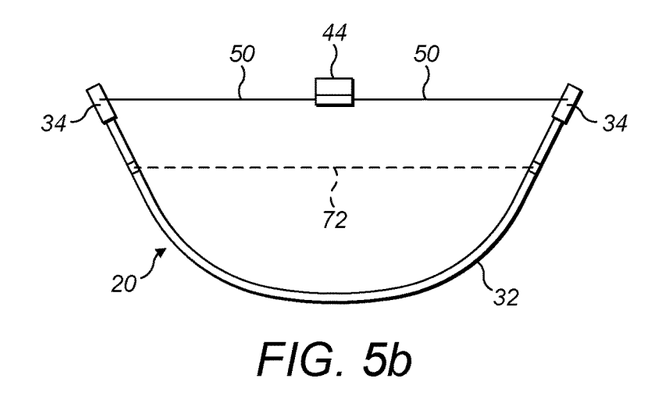
Figure 5C:
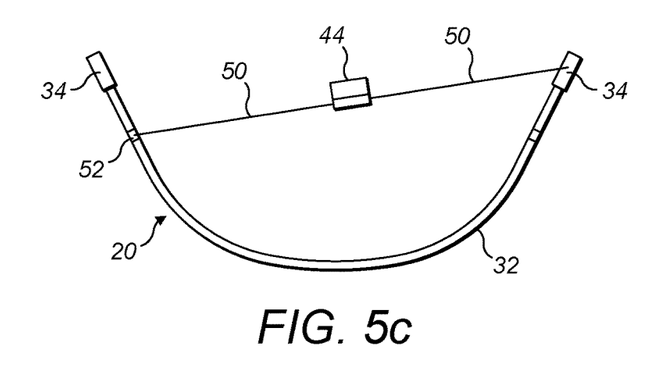

Turning next to FIGS. 5a to 5c of the drawings, these schematic plan views show different positions at which puller wires 50 extending from the puller device 44 may be attached to the spool 20.

For ease of comparison, FIG. 5a shows the arrangement described above, in which the puller wires 50 are connected to the clamp sleeves 52. The clamp sleeves 52 are positioned inboard of the ends of the pipe 32 that constitutes most of the length of the spool 20. This arrangement reflects that a puller wire 50 may be attached to the pipe 32 and also that the point of attachment is preferably positioned inboard of an end of spool 20, albeit closer to that end of the spool 20 than to the longitudinal mid-point 70 of the spool 20. This gives adequate control of the position and orientation of the ends of the spool 20 but without the puller wires 50 obstructing the ends of the spool 20.

FIG. 5b shows a different approach, which is to connect the puller wires 50 to the end connectors 34 of the spool 20. If the risk that the puller wires 50 could obstruct the ends of the spool 20 is tolerable, connecting the puller wires 50 at or very near to the ends of the spool 20 optimises control of the position and orientation of those ends. It also minimises the tensile loads that must be borne by the puller wires 50 to impart a given degree of curvature to the pipe 32 of the spool 20.

FIG. 5b also shows an auxiliary wire 72 extending between longitudinally-spaced locations on the spool 20, in this example between the clamp sleeves 52. The auxiliary wire 72 is an example of a permanent tensile support member that enables the puller device 44 and the puller wires 50 to be removed while maintaining the bend in the pipe 32.

FIG. 5c shows that it is possible to combine the approaches of FIGS. 5a and 5b. In this option, one of the puller wires 50 is connected to a clamp sleeve 52 inboard of one end of the spool 20 and the other of the puller wires 50 is connected to an end connector 34 at the other end of the spool 20. In this way, the puller wire 50 connected to the clamp sleeve 52 leaves the adjacent end of the spool 20 unobstructed whereas the puller wire 50 connected to the end connector 34 optimises control of the position and orientation of the end connector 34.

The clamp sleeves 52 on the pipe 32 to which puller wires 50 are not connected may advantageously be omitted, although they are shown in FIGS. 5b and 5c by way of comparison.

Figure 6:
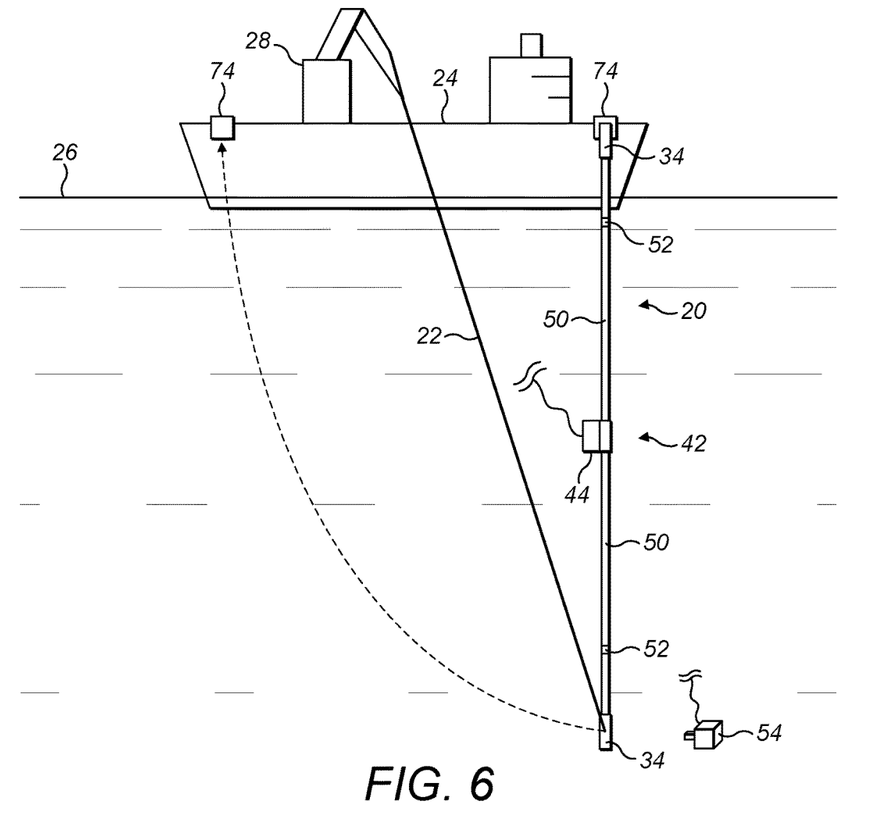
FIG. 6 is a schematic side view of a spool as shown in FIG. 1 hanging vertically in the sea, attached at a first end to a first hang-off platform of an installation vessel to show how the principle of the invention may be applied also to transportation of a spool.
Figure 7:
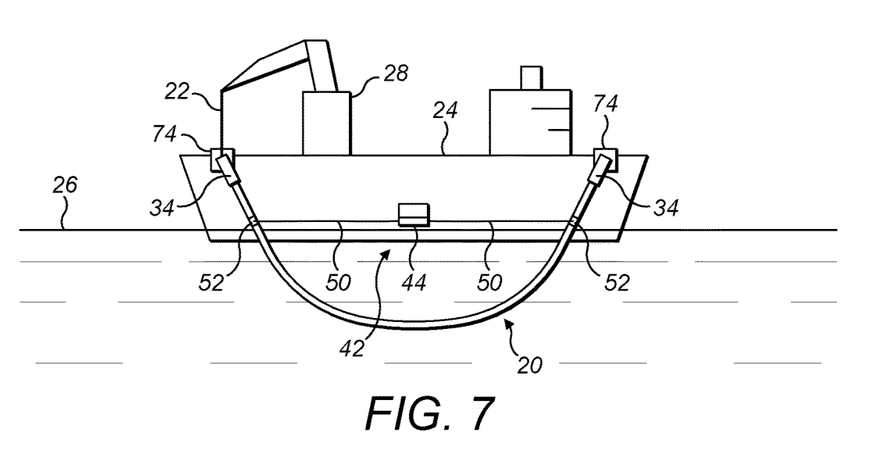
FIG. 7 is a schematic side view corresponding to FIG. 6 but now showing the spool in a curved configuration and also attached at a second end to a second hang-off platform of the installation vessel, to hang between the first and second hang-off platforms as a catenary.

Moving now to FIGS. 6 and 7, these drawings show how the principle of the invention may also be applied to transportation of an elongate subsea element such as a spool. For this purpose, FIGS. 6 and 7 show a variant of the installation vessel 24 in which hang-off platforms 74 protrude laterally from the hull of the vessel 24 at longitudinally-spaced forward and aft locations.

In FIG. 6, one end of the spool 20 is shown hung by its end connector 34 from the forward hang-off platform 74. That end of the spool 20 may be lifted onto the forward hang-off platform 74 by a crane 28 on the vessel 24. The spool 20 hangs vertically in the water at this stage under its own weight. Again, an A&R winch may be used instead of the crane 28 although such a winch has been omitted from FIGS. 6 and 7 for ease of illustration.

A puller system 42 comprising a puller device 44 like that of the preceding embodiments is attached to the pipe 32 of the spool 20 via puller wires 50 and longitudinally-spaced clamp sleeves 52 in this example. The puller system 42 may be attached to the spool 20 underwater or before the spool 20 is submerged.

Next, a wire 22 from the crane 28 is connected by a supporting ROV 54 to the end connector 34 at the lower end of the spool 20. Then, when the puller system 42 is operated to tension and then retract the puller wires 50 into the puller device 44, the pipe 32 of the spool 20 starts to bend in a generally vertical plane. Simultaneously, the wire 22 of the crane 28 is retracted to raise the lower end of the spool 20 toward the aft hang-off platform 74 as the pipe 32 bends further. In doing so, the end connector 34 at the lower end of the spool 20 follows the curved upward path represented by the dashed line in FIG. 6. During that movement, the spool 32 bends or pivots about a generally horizontal axis passing through the forward hang-off platform 74.

Eventually, as shown in FIG. 7, the end connector 34 at the lower end of the spool 20 reaches the aft hang-off platform 74, from which that end of the spool 20 is subsequently hung. The result shown in FIG. 7 is that the spool 20 is held beside the hull of the vessel 24 with both ends securely located by the hang-off platforms 74. The vessel 24 may now more easily and controllably transport the spool 20, in shallower water by virtue of the reduced draft of the curved spool 20 and without extending or exceeding the length of the vessel 24 by virtue of the reduced span of the curved spool 20.

Whilst the puller system 42 could be de-tensioned or disengaged from the spool 20 when the spool is supported at both ends by the hang-off platforms 74, it may be convenient to keep the puller system 42 engaged with the spool 20 while the spool 20 is held temporarily in a curved configuration as during transit of the vessel 24 in FIG. 7. This allows the spool 20 to be released from the hang-off platforms 74 in a controlled manner and then lowered from the vessel 24 upon reaching an installation site. By retracting or paying out the puller wires 50 of the puller system 42 as appropriate, the curvature in the spool 20 may be released, maintained or modified at any time between releasing the spool 20 from a hang-off platform 74 and installing the spool 20 on the seabed.

In other instances, the puller system 42 may be disengaged from the spool 20 when the spool 20 has been connected permanently to another means of supporting the spool 20 in a curved configuration. For example, the puller system 42 may be de-tensioned and removed from the spool 20 once the stab formation 36 at the second end of the spool 20 has been coupled with the second subsea structure 14, soon after the situation shown in FIG. 3. In that case, the stab formations 36 and the connector receptacles 18 must be designed to withstand the lateral loads that will be applied by the curved pipe 32 when the spool 20 is in the final position and the puller system 42 is removed. However, the lateral loads applied by the curved pipe 32 could be reduced or eliminated by replacing the puller system 42 with a permanent tensile support member, such as an auxiliary wire 72 extending between longitudinally-spaced anchorages on the spool 20, such as between the clamp sleeves 52 as shown in FIG. 5b.

In principle, it is not essential for both ends of a puller system 42 to be attached to a spool 20 or other elongate subsea element. In particular, it would be possible to attach one end or puller wire 50 of the puller system 42 to a first anchorage structure distinct from the spool 20, such as the first subsea structure 12 or a first hang-off point 74 on a transport vessel 24. The other end or puller wire 50 of the puller system 42 is attached to a location spaced longitudinally along the spool 20, such as a clamp sleeve 52 or an end connector 34 at or near the opposite end of the spool 20.

Figure 8:
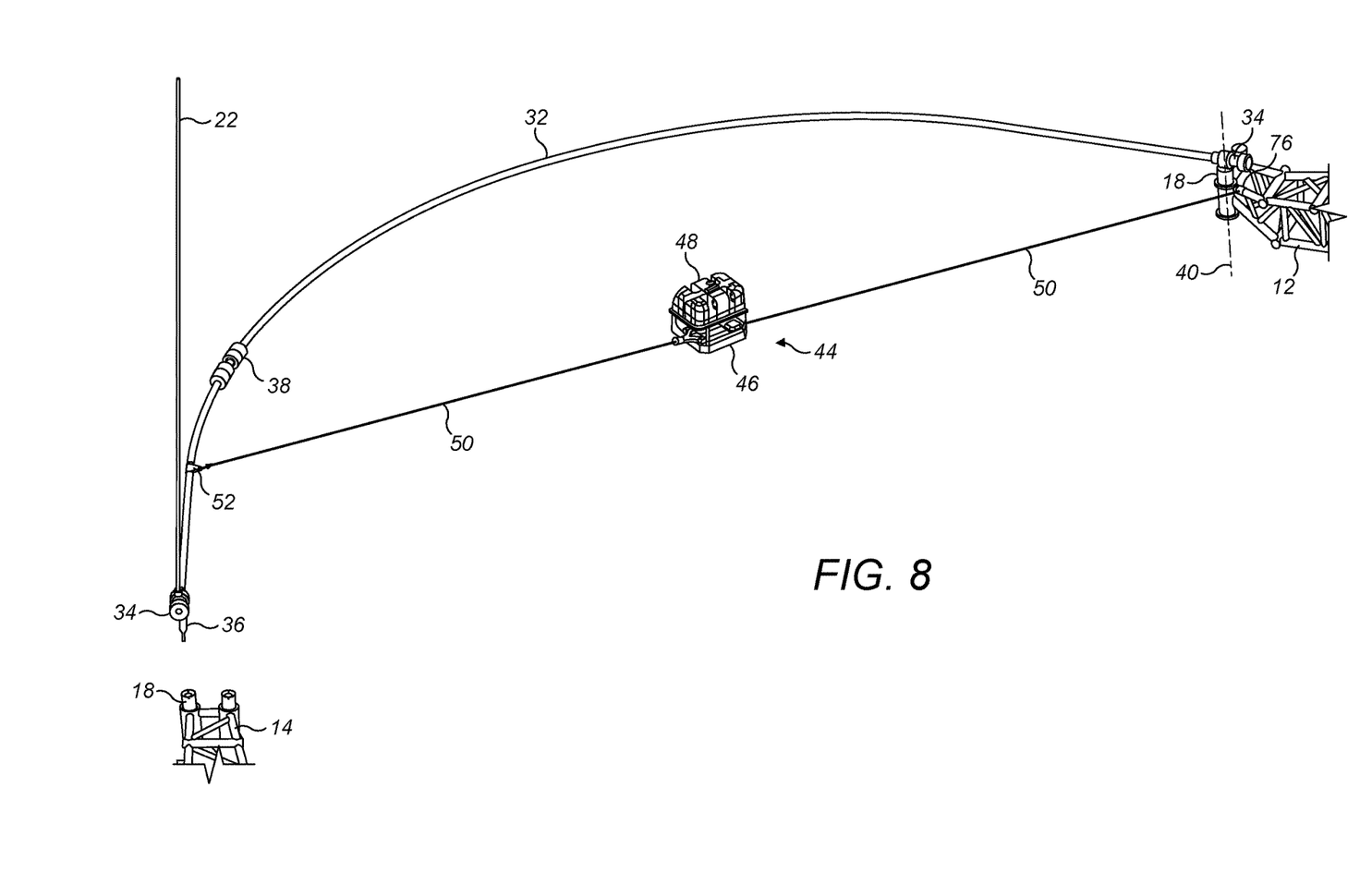
FIG. 8 corresponds to FIG. 3 but shows an optional variant in which one end of the variable-length wire system is attached to the first subsea structure.

By way of example, reference is made in this respect to the final variant shown in FIG. 8, which corresponds to FIG. 3 but deletes the clamp sleeve 52 nearer the first subsea structure 12. Instead, one of the puller wires 50 is connected to an attachment point 76 on the first subsea structure 12. The attachment point 76 is close to or substantially in alignment with the pivot axis 40, and is also close to or substantially in alignment with the horizontal plane of the bent pipe 32.

By virtue of the arrangement shown in FIG. 8, compressive force is applied to the spool 20 via the first subsea structure 12 when the spool 20 is connected to the first subsea structure 12 and the puller wires 50 are tensioned. That compressive force bends the spool 20 before the spool is connected to the second subsea structure 14. Regular installation methodologies may be used to connect the first end of a spool to a first subsea structure. An example is a well-known stab-and-hinge-over arrangement, in which the stab formation of at least one of the end connectors is hinged relative to the remainder of the spool. This allows the spool to be lowered in a non-horizontal, inclined or preferably substantially vertical orientation and landed in that orientation on the first subsea structure. Specifically, the stab formation at the first or lowermost end of the spool is landed in the connector receptacle of the first subsea structure. That first subsea structure can then serve as an anchor for the spool to be pivoted toward the horizontal, as shown in FIG. 1, for its second end to be connected to the second subsea structure as described above with reference to FIGS. 2 and 3.

In other lowering arrangements, a wire that hangs from the installation vessel may be disposed centrally along the length of a spool that is oriented generally horizontally during its transit through the water column. In that case, suitable lifting tackle will be used between the wire and the spool as the spool is lowered before landing on the first subsea structure. Another approach is to use two wires, one at each end of a horizontally-oriented spool. It is also possible for a horizontally-oriented spool to be laid on the seabed adjacent the subsea installation and for the ends of the spool to be lifted subsequently into engagement with the first and second subsea structures in succession.

Many other variations are possible within the inventive concept. For example, the pipe of a spool may be made of other materials such as thin-walled steel. More generally, a pipe is an example of an elongate subsea element that has sufficient rigidity combined with flexibility to be deflected elastically along its length to vary its span. In principle, it would be possible for such an elongate subsea element to serve as a cable, an umbilical or even as a structural member extending between two subsea structures.

An ROV (remotely-operated vehicle) is an example of an unmanned underwater vehicle (UUV) that may be used to embody or to support the puller device. Other UUVs are possible for this purpose, such as an autonomous underwater vehicle (AUV). As described above, the puller device is conveniently implemented in a skid that is attachable to a UUV in a modular fashion but it need not be: a puller device could instead be integrated into a specialised UUV or embodied as a tool that is arranged to be mounted on or carried by a UUV. Thus, the puller device used in the invention need not necessarily have a means for self-propulsion.

In the puller device set out in the foregoing description, the wire drive comprises first and second winches, each winch acting on a respective one of the puller wires. Those winches may be operated individually to adjust the lengths of the puller wires independently. For example, it would be possible for the puller device to adopt a longitudinally-offset position in which one puller wire is longer than the other rather than both puller wires being of substantially equal length. Alternatively, the winches may be operated in unison to adjust the lengths of the puller wires together in a synchronised manner. However, in principle it would be possible instead to spool both of the puller wires on a single common winch drum and to route the puller wires from that drum to extend in opposite directions from the puller device.

The puller device does not necessarily require one or more winches: a jack system could be used instead to retract and to tension the puller wires. Tensile elements other than wires are also possible, for example rods.

The puller system of the invention is preferably attached underwater to the elongate subsea element that is to be bent to determine its span. However, it is possible instead to attach the puller system to the elongate subsea element at or above the surface. For example, the puller system may be attached to the elongate subsea element on board the installation vessel or indeed on land before the element is transferred to the installation vessel for transit to an installation site.

A further advantage of the invention is that a standard elongate element maybe used to suit different applications, within reasonable limits. This can reduce overheads of fabrication and metrology.

The invention claimed is:

1. A method of handling a discrete elongate subsea element of determinate length for transport or installation, the method comprising:
    shortening a tensile chord system acting on longitudinally-spaced locations on the element to apply longitudinally-compressive forces to the element, which forces bend the element along its length between said locations against elastic recovery force to shorten a span of the element;
    anchoring a first end of the element at a first anchorage located at a subsea installation before or after said bending of the element; and
    after said bending of the element and while the element remains bent, anchoring a second end of the element at a second anchorage located at the subsea installation.

2. The method of claim 1, comprising anchoring the first end of the element at the first anchorage, bending the element, and anchoring the second end of the bent element at the second anchorage.

3. The method of claim 1, comprising leaving the tensile chord system in place and under tension after anchoring the second end of the bent element at the second anchorage.

4. The method of claim 1, comprising de-tensioning and replacing the tensile chord system with a tensile support member after anchoring the second end of the bent element at the second anchorage.

5. The method of claim 1, wherein at least one of the longitudinally-spaced locations is substantially inboard of an end of the element.

6. The method of claim 5, wherein said location is nearer an adjacent end of the element than a longitudinal mid-point of the element.

7. The method of claim 1 wherein at least one of the longitudinally-paced locations is at an end connector of the element.

8. The method of claim 1, wherein the tensile chord system is connected to the element at the longitudinally-spaced locations.

9. The method of claim 1, wherein the tensile chord system is connected to the element at one of the longitudinally-spaced locations and is also connected to the first anchorage before said bending of the element, the other of the longitudinally-spaced locations on the element being at the first end where the element is anchored to the first anchorage.

10. The method of claim 1, comprising connecting the tensile chord system to the element or to the first anchorage underwater.

11. The method of claim 1, comprising connecting the tensile chord system to the element or to the first anchorage above water.

12. The method of claim 1, comprising landing at least part of the element on the seabed before anchoring the second end of the element at the second anchorage.

13. The method of claim 12, comprising landing at least part of the element on the seabed before anchoring the first end of the element at the first anchorage.

14. The method of claim 1, comprising adjusting the tensile chord system to modify a bend radius of the element after anchoring the first end of the element at the first anchorage and before anchoring the second end of the element at the second anchorage.

15. The method of claim 1, comprising anchoring the first end of the element at the first anchorage and bending or pivoting the element about the first anchorage before anchoring the second end of the element at the second anchorage.

16. The method of claim 15, comprising bending or pivoting the element about an upright axis.

17. The method of claim 1, comprising suspending the second end of the element by a wire hanging from a surface vessel before anchoring the second end of the element at the second anchorage.

18. The method of claim 17, comprising suspending the second end of the element by the wire hanging from the surface vessel before anchoring the first end of the element at the first anchorage.

19. The method of claim 1, comprising bending the element in a substantially horizontal plane.

20. The method of claim 1, comprising:
flying an underwater vehicle to the element, that vehicle or a skid or tool mounted to the vehicle carrying tensile components of the tensile chord system;
attaching at least one of the tensile components to the element and another tensile component to the element or to the first anchorage; and
retracting the tensile components toward the vehicle, skid or tool to shorten the tensile chord system.

21. The method of claim 20, comprising flying the underwater vehicle to a location between the longitudinally-spaced locations of the element.

22. A method of handling a discrete elongate subsea element of determinate length for transport or installation, the method comprising:
shortening a tensile chord system acting on longitudinally-spaced locations on the element to apply longitudinally-compressive forces to the element, which forces bend the element along its length between said locations against elastic recovery force to shorten a span of the element;
anchoring a first end of the element at a first anchorage before or after said bending of the element;
after said bending of the element and while the element remains bent, anchoring a second end of the element at a second anchorage; and
de-tensioning and replacing the tensile chord system with a tensile support member after anchoring the second end of the bent element at the second anchorage.

23. A method of handling a discrete elongate subsea element of determinate length for transport or installation, the method comprising:
shortening a tensile chord system acting on longitudinally-spaced locations on the element to apply longitudinally-compressive forces to the element, which forces bend the element along its length between said locations against elastic recovery force to shorten a span of the element;
anchoring a first end of the element at a first anchorage before or after said bending of the element; and
after said bending of the element and while the element remains bent, anchoring a second end of the element at a second anchorage, wherein at least one of the longitudinally-spaced locations is at an end connector of the element.

24. A method of handling a discrete elongate subsea element of determinate length for transport or installation, the method comprising:
shortening a tensile chord system acting on longitudinally-spaced locations on the element to apply longitudinally-compressive forces to the element, which forces bend the element along its length between said locations against elastic recovery force to shorten a span of the element;
anchoring a first end of the element at a first anchorage before or after said bending of the element; and
after said bending of the element and while the element remains bent, anchoring a second end of the element at a second anchorage, wherein the tensile chord system is connected to the element at one of the longitudinally-spaced locations and is also connected to the first anchorage before said bending of the element, the other of the longitudinally-spaced locations on the element being at the first end where the element is anchored to the first anchorage.

25. A method of handling a discrete elongate subsea element of determinate length for transport or installation, the method comprising:
shortening a tensile chord system acting on longitudinally-spaced locations on the element to apply longitudinally-compressive forces to the element, which forces bend the element along its length between said locations against elastic recovery force to shorten a span of the element;

anchoring a first end of the element at a first anchorage before or after said bending of the element;

after said bending of the element and while the element remains bent, anchoring a second end of the element at a second anchorage; and connecting the tensile chord system to the element or to the first anchorage above water.

26. A method of handling a discrete elongate subsea element of determinate length for transport or installation, the method comprising:

shortening a tensile chord system acting on longitudinally-spaced locations on the element to apply longitudinally-compressive forces to the element, which forces bend the element along its length between said locations against elastic recovery force to shorten a span of the element;

anchoring a first end of the element at a first anchorage before or after said bending of the element; and after said bending of the element and while the element remains bent, anchoring a second end of the element at a second anchorage, wherein the first and second anchorages are located on a surface vessel.

27. The method of claim 26, comprising hanging the anchored first end of the element from the first anchorage, bending the element, and anchoring the second end of the bent element to hang from the second anchorage.

28. The method of claim 26, comprising pulling the element toward the surface vessel during or after bending to lift the second end toward the second anchorage.

29. The method of claim 26, comprising:

transporting the bent element to an installation site carried by the surface vessel, with the element anchored at its first and second ends to the anchorages; and at the installation site, removing the element from the anchorages before lowering the element toward the seabed.

30. The method of claim 29, comprising removing the element from one of the anchorages and then pivoting the element about the other of the anchorages before lowering the element toward the seabed.

31. The method of claim 29, comprising adjusting the tensile chord system to modify a bend radius of the element before, during or after lowering the element toward the seabed.

* * * * *